May 12, 1925.  1,537,906
C. WEBB
FLY REJECTOR FOR WINDOWS
Filed Aug. 23, 1924
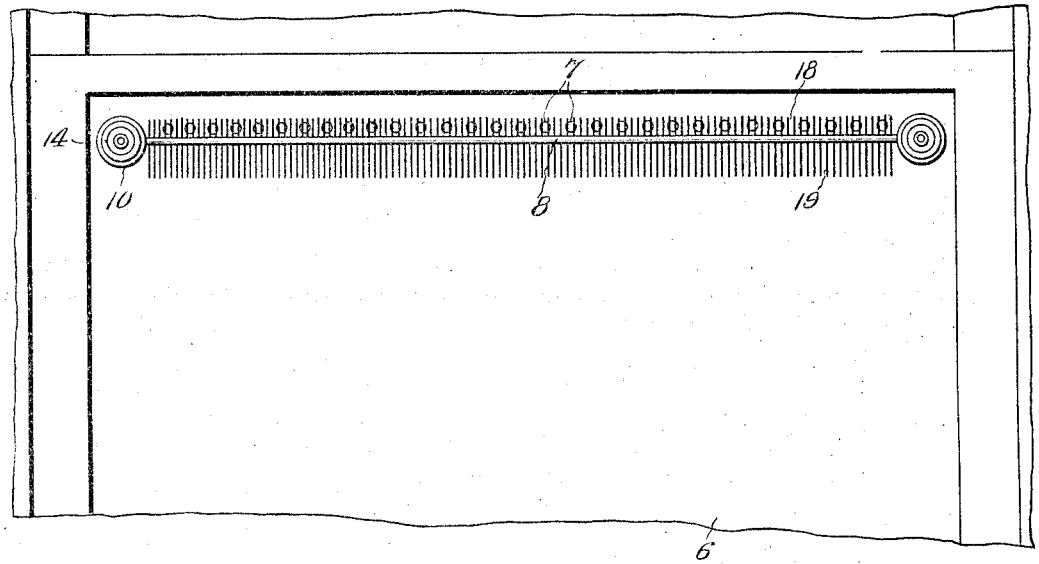
Fig. 1.
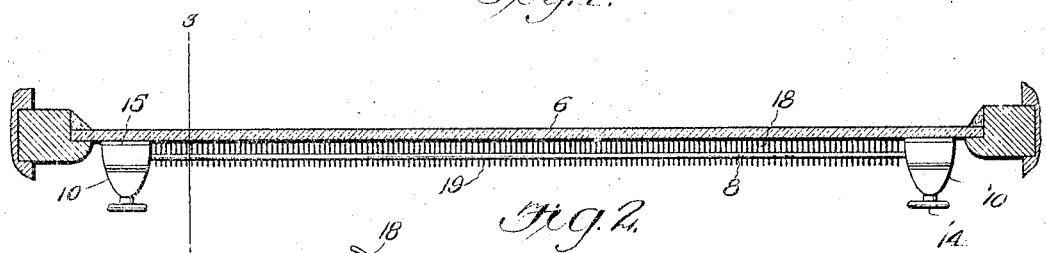
Fig. 2.
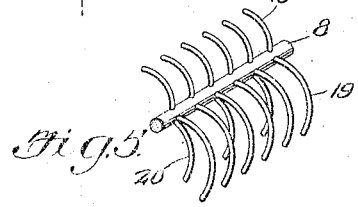
Fig. 5.
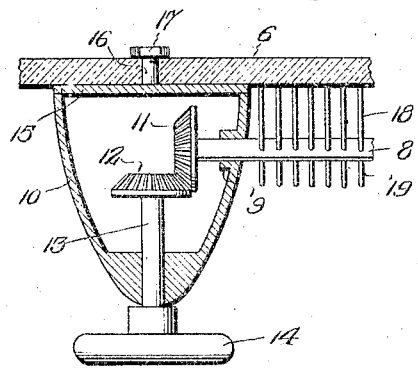
Fig. 4.
Fig. 3.
Inventor
Charles Webb,
By Wilkinson & Ginsta
Attorneys Patented May 12, 1925.

1,537,906

UNITED STATES PATENT OFFICE.

CHARLES WEBB, OF FORT MYER, VIRGINIA.

FLY REJECTOR FOR WINDOWS.

Application filed August 23, 1924. Serial No. 733,851.

*To all whom it may concern:*

Be it known that I, CHARLES WEBB, a citizen of the United States, residing at Fort Myer, in the county of Arlington and State of Virginia, have invented certain new and useful Improvements in Fly Rejectors for Windows; and I do hereby declare the following to be a full, clear, and exact description of the invention, such as will enable others skilled in the art to which it appertains to make and use the same.

The present invention relates to a fly rejector for windows, and has for an object to provide a device adapted to be mounted upon the window or window glass for the purpose of intercepting flies or other insects walking up the window, and diverting such insects to the exterior of the window and the room.

The invention is intended to take advantage of the well known habits of these insects to walk upwardly and toward the light, and to this end openings are made in the window or in the window pane for the purpose of letting the insects out, and the improved device is carried just inwardly of these openings for the purpose of trapping the flies and requiring that the insect seek the outside atmosphere through said openings.

With the foregoing and other objects in view, the invention will be described more particularly in conjunction with the accompanying drawings, in which like symbols refer to like parts throughout the several views.

In the drawings,

Fig. 1 is a fragmentary front elevation of a window equipped with the improved device.

Fig. 2 is a horizontal section taken through the same.

Fig. 3 is a vertical cross section on an enlarged scale taken substantially on the line 3—3 in Figure 2.

Fig. 4 is a horizontal fragmentary section taken on the line 4—4 in Fig. 3, and

Fig. 5 is a fragmentary perspective view of a detail.

Referring more particularly to the drawing, 6 designates the glass of the window or the window pane, in which, according to the invention, a number of small openings 7 are made preferably near the upper portion of the pane and in a substantially horizontal row, these openings being of a size to permit the passage of the fly or of insects that inhabit the locality where the device is in use.

On the interior of the room and parallel with the plane of the window-pane, is supported a rod 8 mounted in bearings 9, provided in housings or gear casings 10, mounted upon the pane at the opposite ends of the rod. The rod 8 will be preferably slightly shorter than the width of the window pane, said rod being of sufficient length to extend over and slightly beyond the row of openings 7. On the ends of the rod, which project into the housings 10, are the bevel pinions 11 disposed in mesh with similar pinions 12 fixed upon the shafts or stems 13, which are journaled through the housings 10 at substantially right angles to the axis of the rod 8. The stems 13 are provided with hand wheels 14 on the exteriors of the housings to permit of convenient rotation of the stems.

The gear boxes are preferably of a generally conical form in order to provide ample space to house the gear wheels and to retain, if necessary, lubricant for the same. The housings will, of course, exclude dust and other foreign matter from the working parts. The base portions of the housings are closed by cover plates 15 so that access may be had to the interior for the purpose of originally mounting the pinions therein and of subsequently supplying lubricant and replacing worn parts. Screws or other fastening means may be provided to hold the cover plates upon the housings, and these covers plates subserve the additional function of clamps for holding the device upon the window-pane 6. To this end, the cover plates are provided with threaded posts 16 adapted to pass through openings made for the purpose in the window-pane. Nuts 17 are threaded upon the exterior ends of the posts 16, and take against the outside of the glass, thus acting also in the capacity of clamps. Felt or other appropriate material may be placed against the glass to avoid the contact of the metal therewith.

The rod 8 is rotatably mounted just below and inwardly of the row of perforations 7. Three sets of fingers are carried by the rod, an upper set indicated at 18, a lower set shown at 19, and a third set 20, which also projects downwardly from the rod, being, however, shorter than the fingers 19 and disposed inwardly thereof. This third set of fingers 20 are disposed only alternately with the fingers 19 as shown in Figure 5. All of the fingers are curved from the rod 8 toward the window glass, the upper fingers terminating just above the row of perforations and very close to the glass. The secondary fingers 19 are more widely separated from the glass, while the third set 20 are shorter than the fingers 19, and are disposed with their lower free ends closer to the glass.

In the use of the device, the flies or other insects will crawl up the window pane, and in this they will not be obstructed by the lower fingers 19 and 20. Finding themselves within the enclosure of the various fingers, the fly will not retrace its steps down the window pane, but will continue upwardly until arriving at the openings 7 to and through which the insects will be directed by the upper curved fingers 18. Of course, these various fingers will be closely assembled so as to prevent the fly from escaping therethrough, and the fingers form, in effect, a cage to house and arrest the fly until he passes through one of the openings 7. One set of fingers 19 may suffice on the lower part of the rod to prevent the fly from escaping downwardly as this is against the habit of the insect, but the additional alternate fingers 20 will aid materially in preventing exit of the insect in this direction.

The hand wheels 14 may be resorted to at any time for the purpose of adjusting the rod 8 angularly, or, in other words, rotating the rod in order to change the angular relation of the fingers with respect to the plane of the glass.

Of course, in winter, the device may be either left upon the window or removed therefrom, and a strip of material placed across the openings 7. The fingers will form a very appropriate means for holding a strip of felt across the openings. The shaft 8 is made rotatable in order to angularly adjust the same and the upper fingers 18 to a position where the latter fingers will be moved as far as possible away from the window pane. This will permit felt or other material to be slipped down between the glass and the upper fingers 18, and to be pushed into the openings 7. The openings may be thus plugged during the winter months.

It is obvious that various changes and modifications may be made in the details of construction and design of the above specifically described embodiment of this invention without departing from the spirit thereof, such changes and modifications being restricted only by the scope of the following claims.

What is claimed is:

1. In combination with a window having an opening, a rotary rod carried adjacent the window and said opening and having fingers projecting above and below for permitting the entrance of insects walking up the window, and guiding such insects outwardly through the opening.

2. In combination with a window having an opening, a rotatable rod mounted within the window adjacent the opening and having fingers extending above and below the opening, said fingers below the opening being spaced from the window to permit the entrance of insects to the space encompassed by said fingers, and means for imparting rotary movement to said rod and fingers.

3. A window glass having openings therein, in combination with a rod journaled for rotary movement upon the glass and having fingers extending upwardly and adjacent the glass just above said openings, said rod also having fingers projecting downwardly and toward the glass, but being spaced from the glass a distance necessary to allow the passage of the insects, and means for adjusting said rod angularly.

4. A window having an opening, gear casings carried by said window adjacent the opening, a rod journaled in said gear casings, shafts also journaled in said gear casing, gear means between said shafts and rod, and fingers projecting above and below the rod and extending toward said window above and below the opening.

5. In a device of the kind described, a window having an opening, a rod supported inwardly of the pane, and slightly below the opening, upper fingers extending from said rod and toward the window pane above the opening, a second set of fingers extending downwardly from the rod and toward the window, but being spaced therefrom, and a third set of fingers also extending downwardly from said rod and inwardly of said second set of fingers, said third set of fingers being also spaced from the window.

6. In combination with a window having an opening, a rod mounted adjacent the opening, an upper series of fingers on the rod extending toward the window above the opening, a second set of fingers extending downwardly from the rod and toward the window below the opening, a third set of fingers within alternate fingers of the second set extending down from said rod, and toward the window below the opening, the ends of the second and third set of fingers being spaced from the window.

CHARLES WEBB.